United States Patent [19]

Mickelson

[11] Patent Number: 4,620,718
[45] Date of Patent: Nov. 4, 1986

[54] KINGPIN LOCK

[75] Inventor: Thorwald J. Mickelson, Excelsior, Minn.

[73] Assignee: Cargo Protectors, Inc., Excelsior, Minn.

[21] Appl. No.: 740,859

[22] Filed: Jun. 3, 1985

[51] Int. Cl.⁴ .......................................... B60R 25/00
[52] U.S. Cl. .................................... 280/507; 70/232; 280/432
[58] Field of Search .................. 280/507, 514, 423 R, 280/432; 70/232, 417, 416, 258, 372

[56] References Cited

U.S. PATENT DOCUMENTS

| | | | |
|---|---|---|---|
| 2,630,698 | 3/1953 | Morrow | 70/232 |
| 2,630,699 | 3/1953 | Langdon | 70/232 |
| 2,641,124 | 6/1953 | Gallagher | 70/232 |
| 3,415,085 | 12/1968 | Eble | 70/232 |
| 3,763,675 | 10/1973 | Hofmeister | 70/232 |
| 3,798,938 | 3/1974 | McCullum | 70/232 |

Primary Examiner—John J. Love
Assistant Examiner—Everett G. Diederiks, Jr.
Attorney, Agent, or Firm—Alan G. Greenberg

[57] ABSTRACT

This invention relates to equipment for securing a truck trailer against theft by protecting the trailer kingpin against be secured by a tractor. The device employs a lock housing or body which has a hole which is adapted to fit over the trailer kingpin. A sliding member is employed to go into sliding contact with the groove in a standard trailer kingpin. The sliding member is configured with a concave edge on one end in order to contact the annular groove in the standard trailer kingpin. A slot in the sliding member is used to engage the body of a heavy duty padlock when in the locked position thus holding the sliding member in contact with the trailer kingpin. A retaining means such as a screw threadably secured to the lock body and a mating slot in said sliding member is employed to prevent the inadvertant removal of said sliding member from the lock body.

6 Claims, 3 Drawing Figures

KINGPIN LOCK

This invention relates to security devices for the trucking industry, and more particularly to a means for preventing the theft of truck trailers, either alone or fully loaded with valuable cargoes.

In recent years trucks have been transporting increasingly more valuable loads. Because of this thieves have found the theft of entire trailers and the loads contained therein to be highly profitable. As the loads become even more expensive the thieves become more brazen and daring.

Consequently it is a purpose of this disclosure to provide the most secure means for protecting a trailer, either empty or loaded, from theft.

Previous devices for protecting the trailer kingpin from being connected to a tractor have had flaws which made them accessible to a determined thief. Certainly my earlier inventions depicted in U.S. Pat. Nos. 3,763,675 and 3,922,897 will deter many attempted thefts. However, a dedicated thief who studies the lock can find that it may be readily defeated and opened by simply drilling a hole on the side through which the locking bar may be withdrawn, thus allowing the lock to be removed from the trailer kingpin and the thief to hook up his tractor and drive away with the load in short order.

The device of this present teaching overcomes the above shortcomings by presenting virtually a solid mass of metal which will take a thief substantial time to defeat. Time is one thing that is in short supply for a thief.

Referring now to the drawings.

Figure 1:
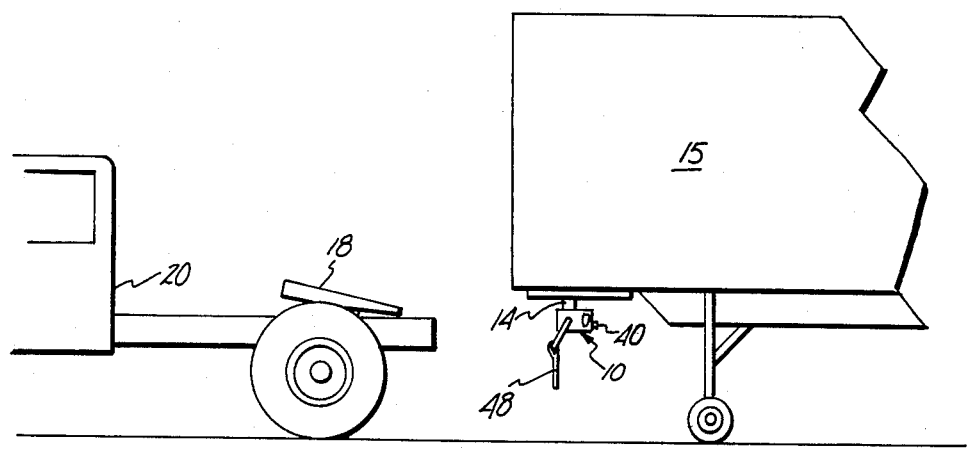
FIG. 1 is a pictorial view of the trailer kingpin lock in place on a truck trailer.
Figure 2:
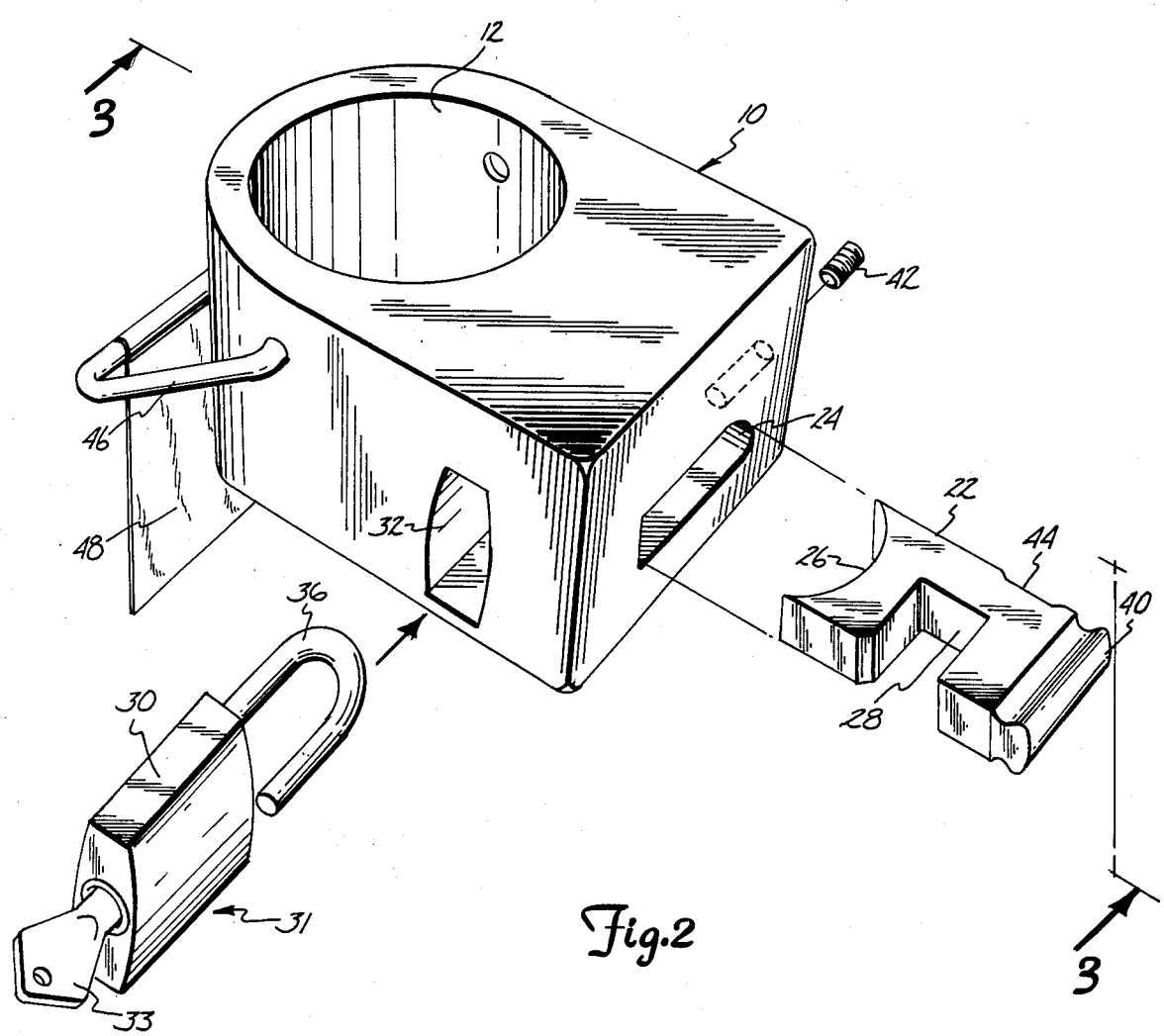
FIG. 2 is an isometric exploded view of the device of this invention.
Figure 3:
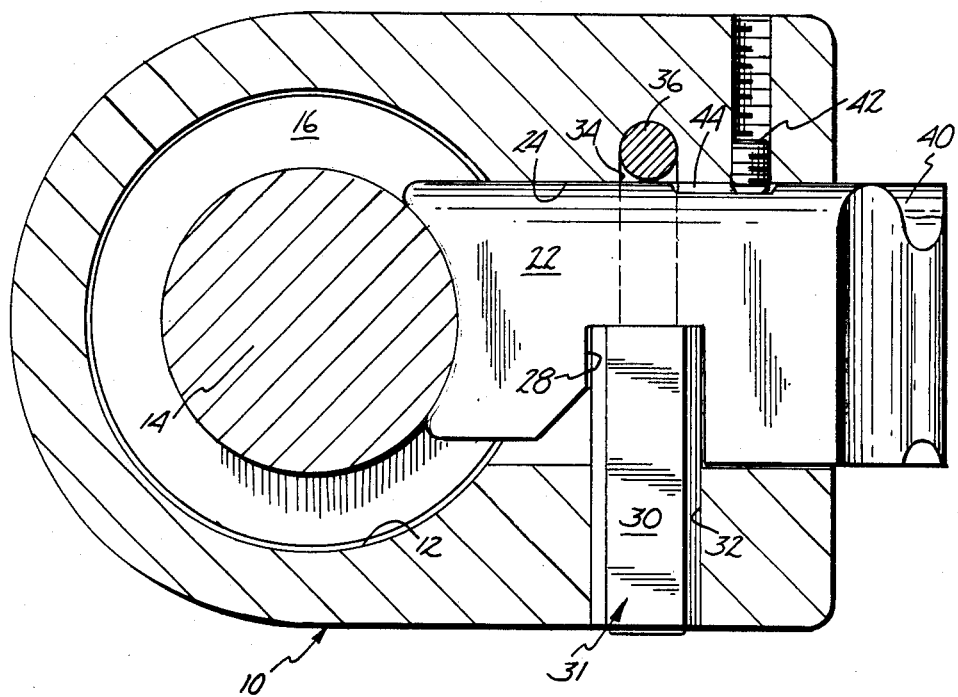
FIG. 3 is a section view taken along the plane 3—3 of FIG. 2 and in the direction of the arrows with the kingpin locked within the lock body.

In FIG. 1, a lock body or trailer kingpin housing 10 is provided with a hole 12 adapted to fit over a standard trailer kingpin 14. All standard trailer kingpins 14 have an annular groove 16 in them to receive and secure the fifth wheel 18 on a tractor 20.

A sliding member or securing means is slidably secured to lock housing 10 transverse to the longitudinal axis of hole 12. One suitable securing means is demonstrated by the elongated member 22. Elongated member 22 is slidably secured to lock housing 10 through slot 24. One end of elongated member 22 is formed as a concave edge 26 adapted to engage annular groove 16 of a standard trailer kingpin 14 when elongated member 22 is inserted all of the way into slot 24.

A locking means is provided to selectively hold elongated member 22 from moving transverse to the longitudinal axis out of engagement with annular groove 16. Suitable locking means are shown by providing elongated member 22 with slot 28 which can engage and mesh with the body 30 of padlock 31 when padlock 31 is in the locked position. Though many different makes and models of padlocks 31 may be employed, one very desirable one is an ABLOY lock which employs non-copyable keys 33. Padlock 31 is fit into lock housing 10 through lock slot 32. A second lock slot 34, is of such dimension as to receive shackle 36, of padlock 31 when padlock 31 is locked all of shackle 36 and padlock body 30 are completely enclosed and protected by lock body 10. As is obvious, when padlock 30 is unlocked elongated member 22 may readily pass through shackle 36 and be drawn out of engagement with annular groove 16 of standard trailer kingpin 14. To facilitate the withdrawal of elongated member 22 a grooved handle 40 is provided. However, when padlock 31 is locked, padlock body 30 engages slot 28 of elongated member 22 and holds that member firmly in contact with annular groove 16 of trailer kingpin 14 preventing removal of kingpin lock 10 from trailer kingpin 14.

To prevent the inadvertant loss of elongated member 22 a retaining means is provided. One retaining means which works well is to employ a set screw 42 threaded into lock body 10. A slot 44 in elongated member 22 is adapted to mesh with and engage set screw 42. By controlling the length of slot 44 it is obvious that the limits of motion of elongated member 22 may be controlled. It is obvious that the set screw 42 may be threaded into elongated member 22 and that the mating slot 44 be provided in lock housing 10 to accomplish the same end.

A handle 46 may be secured to lock housing 10 in order to facilitate the handling and carrying of the unit. Further a flag or ribbon 48 may be employed so that a driver viewing the trailer 15 and attempting to hook up to it can observe that the trailer kingpin 14 is protected and incapable of being hooked up.

When it becomes desireable to secure a trailer 15 against theft, the operator would unlock padlock 31 with key 33. Padlock body 31 may then be partially withdrawn from lock housing 10 to go out of engagement with slot 28 of elongated member 22, allowing that member to be partially withdrawn from slot 24. The movement of elongated member 22, however, is limited by set screw 42 engaging the edge of slot 44. When elongated member 22 is withdrawn the concave edge 26 is drawn out of hole 12 permitting a cylinder of full diameter, such as trailer kingpin 14 to pass through. After lock housing 10 is placed over trailer kingpin 14, elongated member 22 may be pushed into contact with trailer kingpin 14 as by concave edge 26 into annular groove 16. Padlock body 30 is then pushed into engagement with shackle 36 and is locked preventing movement of elongated member 22 relative lock housing 10.

I claim:

1. A trailer kingpin locking device comprising: a lock body including a hole through said body to accept a standard trailer kingpin through said hole; a sliding member slidably secured to said lock body transverse to the longitudinal axis of said hole for selectively reducing the diameter of said hole to selectively retain a standard trailer kingpin inserted in said hole, said sliding member includes a slot and is selectively engaged and retained by a locking means when in the position of selectively reducing the diameter of said hole; said locking means comprising a key type padlock having a body portion which is inserted in said slot and a shackle portion which surrounds a portion of said sliding member when said padlock is locked, said padlock located within said lock body so as to be being, fully enclosed, except for key access to said padlock when locked, said padlock selectively securing said sliding means against movement transverse to the longitudinal axis of said hole; and stop means operably secured to said lock body and engaging said slide member to prevent inadvertent removal of said sliding member from said lock body.

2. The trailer kingpin locking device of claim 1 further characterized in that said stop means limiting the sliding travel of said sliding member between two extreme positions of movement.

3. The trailer kingpin device of claim 2 further characterized by said stop means comprising a set screw threadably secured to said lock body and a longitudinal indented portion in said sliding member said set screw engaging said indented portion when tightened to limit the sliding movement of said slide member.

4. A trailer kingpin locking device comprising: a kingpin housing for selectively engaging and covering a standard trailer kingpin to prevent unauthorized engagement of the trailer kingpin, said kingpin housing including a hole to fit over a standard trailer kingpin; securing means slidably secured to said kingpin housing said securing means protruding into said hole in said kingpin housing to selectively engage the annular groove of a standard kingpin; locking means which cooperate with said kingpin housing to engage said securing means to prevent unauthorized removal of said kingpin housing from a kingpin when locked; said securing means comprising an elongated member having a concave edge configuration at one end thereof which the annular groove of a standard kingpin and a transverse slot near the opposite end of said elongated member, said locking means comprising a heavy-duty key type padlock having a body portion and a shackle portion, said body portion being received in said slot and said shackle portion extending around a portion of said elongated member when said padlock is locked, said padlock being fully enclosed, except for key access, within said kingpin housing when locked; and retaining means for preventing inadvertent removal of said elongated member from said kingpin housing when said padlock is unlocked.

5. The trailer kingpin locking device of claim 4 further characterized by said heavy duty padlock comprising a padlock which utilizes special non-copyable keys.

6. The trailer kingpin locking device of claim 4 further characterized by said retaining means comprising a setscrew threadably secured to said kingpin housing and orientated to engage an indented portion of said elongated member so as to prevent the inadvertent removal of said said elongated member from the kingpin housing when said padlock is in an unlocked position.

* * * * *